United States Patent Office 3,725,098
Patented Apr. 3, 1973

3,725,098
HEAT-SEALABLE COATINGS OF IMPROVED WETTABILITY AND METHODS OF PRODUCING THE SAME
Pierre Hullot, 12 Rue de Celestins, 78 Limay, France
No Drawing. Continuation-in-part of application Ser. No. 808,297, Mar. 18, 1969. This application Oct. 18, 1971, Ser. No. 189,831
Claims priority, application France, June 21, 1968, 155,993
Int. Cl. C08h 27/60
U.S. Cl. 106—180                                    4 Claims

ABSTRACT OF THE DISCLOSURE

A heat-sealable coating of improved wettability by water and improved adhesion through aqueous glues comprising a conventional heat-sealable coating, e.g., a nitrocellulose varnish having incorporated therein one or more waxes, having an average hydroxyl number between 150 and 400, preferably between 200 and 300. The waxes are preferably incorporated into the coating in an amount of between 0.5% and 5% by weight, the improved heat-sealable coating preferably being applied to a regenerated cellulose film.

---

This application is a continuation-in-part of my copending application 808,297 filed Mar. 18, 1969, now abandoned.

The present invention is directed to an improvement in heat-sealable coatings for film materials; more particularly, the present invention is directed to an improvement in a method of providing heat-sealable coatings and such heat-sealable coatings applied to regenerated cellulose films, the coatings having improved wettability and improved adhesion to aqueous glues.

It is well known that nitrocellulose varnishes and a certain number of other varnishes based for example on vinyl chloride copolymers or vinylidene chloride copolymers dissolved in organic solvents have the property of rendering heat-sealable substrates which are not inherently heat-sealable. Such heat-sealable substrates which are not inherently heat-sealable include films of regenerated cellulose. Such heat-sealable substrates which are not inherently heat-sealable also include those materials which are only heat-sealable under conditions which can cause certain disadvantages which must be avoided in the preparation of the heal-sealable film. Such materials include films such as, polypropylene, polyesters, and polyamides, in addition to films of cellulose acetate and other cellulose derivatives such as hydroxyethylcellulose.

In addition to applying the heat-sealable characteristics to those substrates which are not inherently heat-sealable as noted above, the varnishes that are conventionally employed frequently also exhibit other advantages. Thus, for example, such varnishes may provide an improved moisture barrier effect and in addition, in the case of substrates consisting of regenerated cellulose, such varnishes may provide the effect of improving the flatness of the substrate. Additionally, through the use of certain waxes it is possible to give the films a well defined permeability which can be adjusted, for example, to the water vapor exchanges which are desirable between products packaged in these films and the exterior environment.

The films which have been coated in this way generally offer the same advantages as the non-coated films together with the additional advantage of being rendered heat-sealable. However, they suffer from the disadvantage of being difficult to wet by liquids and above all by aqueous compositions. This disadvantage sometimes proves a great nuisance. In fact, the coated heat-sealable films must frequently be printed, and in printing the surface must be easily wetted by flexographic, typographic, heliographic and other printing inks, in which the liquid agent can consist of an organic solvent, an oil, or water.

Additionally, the films coated with heat-sealable coatings can be used according to processes and on machines of greatly varying types and they frequently have to be treated with adhesive fluids based on volatile solvents, with fused mixtures or with aqueous glues. Accordingly, they have to be able to be wetted by these products.

Furthermore, the coatings frequently serve as a substrate for other coatings which are deposited in the fluid state and which add their intrinsic properties to those of the nitrocellulose or similar varnishes. Such is, for example, the case with furnishing coats, with slip agents, with antistatic agents or with other agents which are applied by spraying, in solution or in emulsion. This, therefore, provides further incentive for improving the wettability of these coatings by water or by solvents.

Also, the varnishes should not be considered solely by themselves. In fact, they generally contain many adjuvants, resins, plasticizers and also waxes, the presence of which is indispensable for giving the films the correct slip, for making them easier to wind on rolls and for giving these coatings a defined permeability effect. It has been heretofore known that waxes and particularly paraffin waxes, which are very frequently used, are generally difficult to wet with water. Furthermore, among all the adjuvants employed, the waxes are those which are the least compatible with the nitrocellulose and similar varnishes to the effect that they tend to accumulate at the surface, which, therefore, increases the difficulties of wetting.

In accordance with the present invention, it has been discovered that such inherent disadvantages associated with the conventional heat-sealable coatings, particularly, with respect to their wettability by water and organic solvents can be eliminated. This has been accomplished by incorporating within the conventional heat-sealable composition, e.g., nitrocellulose varnish, one or more waxes, having an average hydroxyl number of between 150 and 400, preferably between 200 and 300. By incorporating such waxes having such particular hydroxyl number within the heat-sealable composition it has been found possible to provide such a composition having a completely satisfactory degree of wettability by organic solvents and water with an improved adhesion to aqueous glues.

Accordingly, it is a principle object of the present invention to provide a heat-sealable composition as well as a film containing the same, which heat-sealable composition is free from the inherent deficiencies and disadvantages of previously employed heat-sealable materials.

It is a further object of the present invention to provide such a heat-sealable composition which has a very satisfactory degree of wettability by organic solvents and water and an improved adhesion to aqueous glues.

It is still a further object of the present invention to provide such an improved heat-sealable composiiton which is based upon a nitrocellulose varnish having a definite degree of permeability to water vapor.

It is yet a further object of the present invention to provide such an improved heat-sealable composition having an extremely satisfactory degree of wettability by organic solvents and water, the improved characteristics being associated by incorporating within the heat-sealable composition one or more waxes having an average hydroxyl number between 150 and 400, preferably between 200 and 300.

A still further object of the present invention comprises an improved heat-sealable composition particularly adapted to provide heat-sealable properties to a regenerated cellulose film with attendant improvement in the wettability by organic solvents and water and adhesion to aqueous glues, Still further objects and advantages of the novel product and composition of the present invention will become more apparent from the following more detailed description thereof.

The above advantages of the novel heat-sealable compositions of the present invention are achieved by incorporating within a conventional composition, e.g., nitrocellulose varnish or similar varnish a minor amount of one or more waxes having an average hydroxyl number between 150 and 400, preferably between 200 and 300. The hydroxyl number referred to in the present application is expressed as the number of milligrams of caustic potash required to neutralize the amount of acetic acid which combines by acetylation of the hydroxyl groups of 1 gram of wax.

Accordingly, the waxes employed in accordance with the heat-sealable coating compositions of the present invention are employed in lieu of the low hydroxyl content waxes, e.g., paraffin or micro-crystalline petroleum waxes, generally employed as adjuvants in heat-sealable compositions. In accordance with the present invention, the wax employed may be a single wax of appropriate hydroxyl content or a mixture of a conventional paraffin or micro-crystalline petroleum wax or similar wax having a low hydroxyl content and a wax of high hydroxyl content, it being only necessary that the average hydroxyl number of the waxes incorporated be between those limits specified above. The use of a mixture of two or more waxes is frequently preferred since this makes it possible to use commercially available waxes and to adjust the proportion thereof as a function of the degree of wettability which is desired to be obtained as well as the water vapor permeability sought. Again, the mixture of waxes is easily obtained by mixing a conventional wax having a low hydroxyl content with one or more waxes having a high hydroxyl content, i.e., within or above the average hydroxyl number so that the resultant mixture has an average hydroxyl number within the range of 150 to 400.

In accordance with the present invention, it has been discovered that if the hydroxyl number is lower than 150 a result is obtained which allows insufficient wettability by water, causing poor adhesion by aqueous glues. Such a product is one, for example, which would be obtained if only a conventional paraffin wax were employed in the heat-sealable composition. On the other hand, if a mixture of waxes is employed which has a hydroxyl number above the upper limit specified above, i.e., above 400, a product will result which is poorly wetted by organic solvents causing poor ink acceptability. Accordingly, in order to achieve wettability which is satisfactory over the wide range of hydrophobic liquids and hydrophilic liquids it is necessary that the hydroxyl number of the wax or mixture of waxes be within the specific limits specified above.

In order to obtain optimum results in this regard, it is preferable that the mixture of waxes or single wax employed have a hydroxyl number within the range between 200 and 300.

The amount of the wax or mixture of waxes employed in accordance with the present invention does not generally differ from that usually employed in varnishes of lesser wettability characteristics. In this regard, it has been found that the wax or mixture of waxes should be employed in an amount of from about 0.5% to about 5% by weight, based on the weight of the total composition. In this regard, it has been discovered that if an excessively high proportion above 5% by weight is employed the product would have certain disadvantages including a significant reduction in the heat-sealability of the coating. If the amount of the wax or mixture of waxes employed is substantially less than about 0.5% by weight, the advantages associated with the incorporation of the waxes are not effectively achieved. In accordance with the present invention it has been found that it is preferable to employ the wax or mixture of waxes in an amount of between 1% and 3% by weight, based on the weight of the total composition.

The waxes according to the invention must possess the usual properties of waxes used in heat-sealable coatings. They must have sufficient compatibility with the coating not to reduce its transparency; they must have an advantageous effect on slip; they must not have a harmful effect on the heat-sealability; they must as far as possible have a relatively good coefficient of permeability. The waxes according to the invention must furthermore have a relatively high melting point so as to facilitate printing and to avoid transfer of the ink onto the opposite face. For this purpose, the melting point of the mixture of waxes should preferable be above 65° C.

Based upon the above considerations, the hydroxylated waxes that can be advantageously employed in accordance with the present invention can belong to a number of different categories of known materials. Thus, for example, the hydroxylated waxes may be fatty hydrocarbons containing no other substituents than the hydroxy groups. Thus, for example, representative compounds falling within this class include $\alpha,\beta$-hydroxystearic alcohol, octadecanediol, nonadecanediol, octadecanetriol, nonadecanetriol, eicosanediol, eicosanetriol, etc. Generally, such fatty hydrocarbons containing no other substituents than hydroxyl groups are hydrocarbons containing two or three hydroxyl groups and having a total of at least sixteen carbon atoms. Preferably such materials contain from about sixteen to about twenty-four carbon atoms. It is, of course, obvious that higher molecular weight materials can be advantageously employed as long as such materials possess those characteristics noted above.

A further group of materials which can be advantageously employed in accordance with the present invention are the free hydroxylated fatty acids. These materials include such as $\alpha$-hydroxystearic acid, ricinoleic acid and etc., as well as the amide, e.g., ethanolamide derivatives as well as other derivatives of such acids. Here again the $\alpha$-hydroxy-substituted higher fatty acids having from 16 to 24 carbon atoms which can be advantageously employed in accordance with the present invention as well as the derivatives thereof need only conform to the above general characteristics to be suitably utilized.

It is also within the scope of the present invention to use ester waxes and particularly esters of polyols with fatty acids, either if these esters have maintained free hydroxyl groups or if the fatty acids themselves contain hydroxyl groups. It is, for example, possible to use glycerine monostearate or distearate, pentaerythritol monostearate, distearate or tristearate, glycol monostearate, etc. In these esters the stearic acid function can be replaced by higher fatty acids having from 16 to 24 carbon atoms such as palmitic acid, behenic acid or other unsaturated acids which are reacted with the polyols, allowing at least one hydroxyl group thereof to be substituted. It is also possible to use esters produced from fatty acids which are already hydroxylated such as $\alpha$-hydroxystearic acid, ricinoleic acid or others and polyols, such as the monoester, diester of triester of $\alpha$-hydroxystearic acid with glycerine or with all kinds of polyols, the glycols, pentaerythritols or others.

It can be seen from the above that any and all of such known materials can be employed in accordance with the present invention to provide the desired wax or mixture of waxes having the necessary hydroxyl number with the range of 150 to 400. Accordingly, the term "wax" as employed through the instant specification is meant to embrace any and all of such materials which have wax-like properties and which conform to the other requirements set forth above.

As indicated previously, in practicing the present invention the wax or mixture of waxes having the hydroxyl number within the above indicated range can be incorporated into any conventional thermo-sealing varnish which is applied to conventional synthetic films in order to allow the film to be sealed by heating in a standard manner. Such conventional varnishes include, for example, varnishes having a nitrocellulose base, those having a polymerized vinyl chloride base, those having a polymerized vinylidene chloride base, mixtures of these latter two, and those having as a base a composition comprising various copolymers of vinyl chloride and/or vinylidene chloride with comonomers such as vinyl acetate, acrylonitrile, methylmethacrylate, styrene, etc. It is to be noted, of course, that such varnishes mentioned above are merely exemplary of those suitably and conventionally employed for thermo-sealing properties and any conventional thermo-sealing varnish can be utilized in accordance with the present invention.

Similarly, the synthetic materials that can be sealed by the composition of the present invention include all those conventionally made heat-sealable by the application of varnish and similar coatings. These include, as non-limitative examples, films or regenerated cellulose (rayon and cellophane), films of celluose acetate, poyester films, polyethylene, polypropylene, cellulose ether films, polyvinyl chloride, polyvinyidene choride poyvinyl acetate, polyviny pyrrolidone, polyurethanes, (i.e., polyether and polyester based polyurethanes), polyamides, natural and synthetic rubbers and derivatives and various other synthetic materials as well as various copolymers of the exemplary materials above. Of those mentioned above, the present invention has found particular utility in the heat-sealing of cellulose films and regenerated cellulose films in particular.

The films which have been coated in accordance with the invention have an improved wettability which particularly manifests itself through better adhesion to aqueous glues. The wettability of the aqueous glues is assessed by measuring the value of the bond obtained under the following conditions:

A 2-mm. wide streak of glue is traced by means of a ruler, in the transverse direction, on a 38-mm. wide strip of film, and a second strip of the same width is then applied to the first strip under high pressure. The two strips are thereafter separated from one another by means of a tensometer which indicates the strength of the bond in grams. The seal strength of identical samples is measured twice, once five minutes after glueing and a second time 24 hours later, with the samples meanwhile being kept in an environment of 40% relative humidity. An aqueous glue consisting of a 50% strength polyvinyl acetate emulsion is used for carrying out these tests. The peel strength measured on the tensometer under the conditions defined above must be greater than 100 grams after 5 minutes and greater than 200 grams after 24 hours.

The application of the present invention to cellulose films coated with a nitrocellulose varnish makes it possible, by choosing appropriate mixtures of waxes, to obtain films having a particular permeability at a given temperature, the strongly hydroxylated waxes generally being more permeable than the waxes of low hydroxyl number and being capable of providing a certain permeability at low temperatures. However, other properties inherent in each wax play a part in determining their permeability which must thus be adjusted in each case in accordance with experimental data and in accordance with the requirements of the type of package envisaged.

The permeability is expressed as the number of grams of water passing through a surface of 100 square meters in one hour at 39° C. at 100% difference in relative humidity between the two faces of a film. In accordance with the present invention it is possible to obtain heat-sealable cellulose films which are easily sealed by means of aqueous glues and have a water vapor permeability which can be between 3000 and 8000.

It is again pointed out that in accordance with the present invention it is possible to employ a single wax or a mixture of waxes as long as the average hydroxyl number is within the range of 150 to 400, preferably within the range of 200 to 300. In this regard, as indicated previously the wax material specified above having the desired hydroxyl number can be employed alone or can be employed together with conventional paraffin wax or similar materials having a lower hydroxyl number as long as the combined materials possess the hydroxyl number set forth above. Thus, for many purposes as indicated previously, the use of a mixture of waxes is preferable in accordance with the present invention.

The present invention will now be illustrated by reference to the following specific examples. Unless otherwise indicated, all percentages are by weight.

EXAMPLE 1

A regenerated cellulose film weighted 30 grams per square meter and containing 15% of glycerine, 9% of water and 0.3% of a cationic melamine-formaldehyde resin was coated on its two faces with a coating of the following composition:

| | |
|---|---|
| Nitrocellulose containing 11% of nitrogen | 48 |
| Dibutyl phthalate | 17 |
| Dicyclohexyl phthalate | 17 |
| Resin resulting from the esterification of 1 molecule of a terpene-maleic acid and ½ molecule of monoethylene glycol | 10 |
| Polypale ester 10 resin of Hercules Powder Co. | 5 |
| Maleic acid | 2 |
| Bentonite | 2 |
| Bentonite | 0.5 |
| α,β-hydroxystearic alcohol | 2 |

This coating is deposited from a solution containing 18% of solids in a mixture of 55 parts of ethyl acetate and 45 (parts) of toluene. It is then dried after coating. The α,β-hydroxystearic alcohol, which melts at 70° and has a hydroxyl number of about 280, gives a satisfactory slip and is equally well wetted by aqueous glues and by printing ink solvents. The premability of the films obtained was about 6000.

The strength of the seals measured according to the process described above reaches 235 grams after 5 minutes and 590 grams after one day, and glueing with aqueous glues is thus extremely satisfactory. This implies a good coefficient of wetting.

EXAMPLE 2

Example 1 was repeated except that the 2 grams of α,β-hydroxystearic alcohol were replaced by an equal weight of the glycerine triester of α-hydroxystearic acid of hydroxyl number 143 which melts at 85°. The coated film, having a permeability of about 5000, was well wetted by organic solvents. Sealing with the aqueous glues, however, gave a seal strength of 65 after 5 minutes and of 300 after one day, these being rather weak seals. This indicates that the wetting by aqueous glues is slightly inadequate. This example, therefore, illustrates the value of using waxes having a hydroxyl number of at least about 150.

EXAMPLE 3

Example 1 was again repeated except that the 2 grams hydroxystearic alcohol were replaced by the following mixture:

1 gram of the glycerine triester of α-hydroxystearic acid, of melting point 85°, and
1 gram of the glycerine monoester of the same α-hydroxystearic acid, of melting point 69° (a commercial product containing some diester).

The resulting coated film containing the mixture of these 2 waxes, of which the average hydroxyl number is 230, was properly wetted both by aqueous liquids (adhesives) and by the organic solvents. The other properties, such as slip, are also good. This example, therefore, illustrates the use of a mixture of commercial waxes which because of ease of supply is preferable to the use of a single wax illustrated by Example 1; the permeability was about 5700.

The value of the seals obtained with aqueous glues of the above-mentioned type (polyvinyl acetate in the form of a 50% strength aqueous emulsion) gave a seal strength of 282 after 5 minutes and of 617 after one day.

It is seen that if in Example 2 half, namely 1 gram, of the glycerine triester of α-hydroxystearic acid of hydroxyl number 143 which produces insufficient wetting by aqueous glues is replaced by 1 gram of the monoester of the same acid, of hydroxyl number about 317, a mixture of waxes of average hydroxyl number 230 is obtained which gives good bonds with aqueous glues. This, therefore, illustrates the improvement in glueing with aqueous glues which is achieved by increasing the hydroxyl number of the waxes.

EXAMPLE 4

The procedure of Example 1 is repeated except that the wax, α, β-hydroxystearic alcohol is replaced with a substantially equivalent amount of the following materials, all of which have a hydroxyl number within the range of 150 to 400:

(A) Octadecanol
(B) α-hydroxystearic acid
(C) Ricinoleic acid
(D) Glycerine monstearate
(E) Pentaerythritol distearate
(F) Glycerine monobehenate
(G) Glycerine monolaurate
(H) Diglyceride of α-hydroxystearic acid
(I) Glycol monosterate
(J) Propyleneglycol monostearate
(K) Methylhydroxy stearate
(L) Hydroxystearamide When tested as in Example 1, articles of substantially equivalent properties are obtained.

EXAMPLE 5

Example 1 is again repeated except that the varnish of nitrocellulose is replaced with a varnish of the following compositions:

A

|  | Grams |
|---|---|
| Copolymer of vinyl chloride and vinyl acetate in a proportion of 87/13 in solution in 600 grams of methyl ethyl ketone, to which has been added 0.2 gram of fine grain silicon (Aerosil O) | 100 |

B

|  | Grams |
|---|---|
| Copolymer of vinylidene chloride and acrylonitrile | 100 |
| Dilauric ketone in solution in 600 grams tetrahydrofurane, a solution to which has been added 0.2 gram of fine grain silicon | 0.5 |

The wax, α,β-hydroxystearic alcohol having a hydroxyl number of about 280 is added to each of the above varnish compositions so that the wax constitutes 0.5, 1.0, 2.0, and 5.0% by weight in different formulations.

Again, when tested in accordance with Example 1, articles of substantially equivalent properties are obtained, the degree of wettability varying somewhat with the amount of wax employed in heat-sealing compositions.

What I claim is:

1. A heat-sealing compositions adapted to be applied to a regenerated cellulose film to impart heat-sealing properties thereto, said composition consisting essentially of a nitrocellulose varnish base and from about 0.5 to about 5.0% by weight of one or more waxes, said waxes being selected from the group consisting of α,β-hydroxystearic alcohol, and mixtures of a glyceric triester of α-hydroxystearic acid and a glyceric monoester of α-hydroxystearic acid and having an average hydroxyl number within the range of 150 to 400, said waxes imparting improved adhesion to aqueous glues and improved printability to organic inks.

2. The composition of claim 1 wherein said wax is α,β-hydroxystearic alcohol.

3. The composition of claim 1 wherein said wax is a mixture of equal parts by weight of said glyceric triester and said glyceric monoester.

4. The composition of claim 1 wherein said wax is present within the range of from 1–3% by weight.

References Cited
FOREIGN PATENTS
146,912 6/1952 Australia _____ 106—180

OTHER REFERENCES
Castrowax and Other Hydroxy Waxes," Technical Bull. No. 88, pp. 8, 9, 28, Baker Caster Oil Co., Bayonne, N.J.

THEODORE MORRIS, Primary Examiner

U.S. Cl. X.R.

106—31, 191, 195; 117—138.8 R, E, F, N, 143 A, 161 R; 260—28.5